Feb. 1, 1944.  P. BLACK  2,340,841
CONDIMENT SHAKER
Filed Sept. 26, 1940
FIG. 1
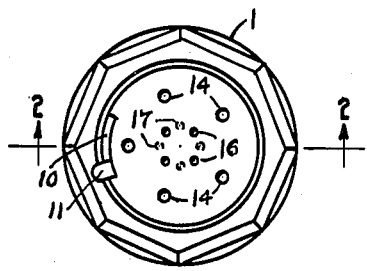
FIG. 2
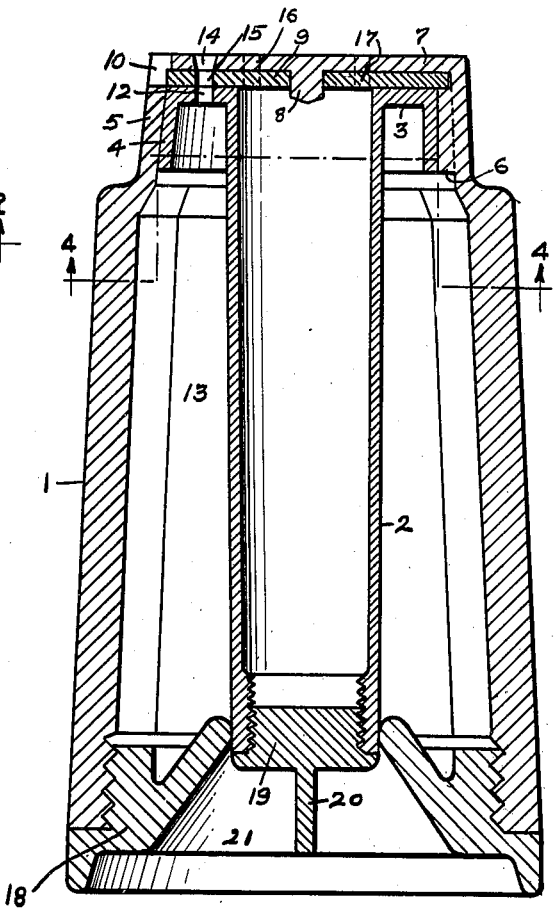
FIG. 3
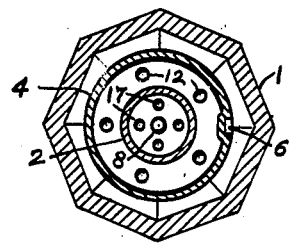
FIG. 4
FIG. 5
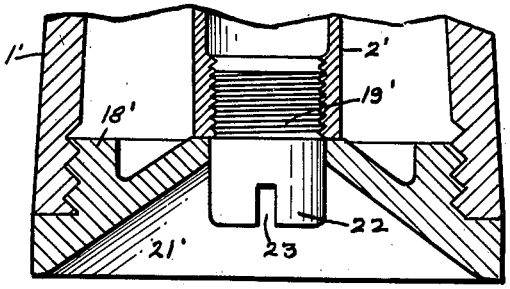
Paul Black INVENTOR.
BY Thomas Howe
ATTORNEY Patented Feb. 1, 1944

2,340,841

UNITED STATES PATENT OFFICE 2,340,841

CONDIMENT SHAKER

Paul Black, Rahway, N. J.

Application September 26, 1940, Serial No. 358,384

4 Claims. (Cl. 65—45)

The invention relates to shakers for pepper and salt or other condiments.

It is a matter of convenience to have pepper and salt contained in a single utensil for the sake of economy, in the number of shakers required and also to relieve against the necessity of exercising care that a number of articles should be present instead of one.

In shakers where the outside casing is provided within which is a receptacle for one condiment, a compartment for the other condiment being provided in the space between the inner receptacle and the outside wall, and a perforated dispensing top is provided together with controlling means for alternately opening and closing the perforations to dispense the different condiments respectively. It has been found that a more efficient and simpler structure is obtained if the compartments are filled from the bottom of the shaker.

It is therefore a main object of the invention to provide a shaker of the character as described having detachable closure means whereby the condiment compartments may be filled from the bottom of the shaker.

It has further been found that the compartments were difficult to fill without spilling condiment intended for one compartment into the compartment for another condiment thereby causing an undesired mixture.

It is, therefore, another main object of the invention to provide a shaker having a plurality of compartments adapted to contain condiments wherein the various compartments may be readily replenished without danger of mixing the different condiments. To this end a shaker is provided having a central inner receptacle with an outer compartment formed by space between it and an outer casing, the whole being capped by a top having perforations with controlling means for alternately opening the perforations to the different compartments respectively, such structure having a detachable bottom portion for closing the outer compartment and a closure for detachably closing the bottom of the inner receptacle, the said bottom portion and the said closure being independently removable whereby the outer compartment may remain closed while the inner compartment is being filled and conversely the inner compartment may remain closed while the outer compartment is being filled, thereby preventing the condiment for one compartment accidentally entering the other compartment and mixing with the condiment therein.

A further object of the invention is to provide the main bottom portion with a funnel-shaped recess which facilitates the filling of condiment into the central receptacle.

Other and ancillary objects of the invention will appear hereinafter.

In the accompanying drawing which illustrates the invention—

Fig. 1 is a top plan view of a shaker embodying the invention with the dispensing controller in position to permit the dispensing from the outer compartment, the perforations for the dispensing from the inner compartment being closed;

Fig. 2 is a section on the line 2—2 of Fig. 1;

Fig. 3 is a top plan view of the shaker of Fig. 2, with the perforation controller being in position to open the perforations for dispensing from the inner receptacle and closing those for the outer compartment;

Fig. 4 is a section on the line 4—4 of Fig. 2; and

Fig. 5 is a central, vertical section, partly broken away, of a modified construction of shaker.

Referring to the drawing and first to Figs. 1 to 4 inclusive, the shaker therein shown comprises an outer wall 1 and a centrally located inner receptacle 2 spaced from the wall 1 to form a compartment for one condiment, the receptacle 2 providing the receptacle for another condiment.

Integral with the upper portion of the receptacle 2 is an outwardly extending flange 3 from the outer edge of which depends the integral flange 4. This flange is rigidly secured to the upper marginal portion 5 of the wall 1.

It will be observed that the outer surface of the flange 4 is tapered and the inner surface of the marginal portion 5 is correspondingly tapered so that by fitting the two together the receptacle 2 and its connected parts are properly longitudinally positioned with relation to each other and a rib 6 on the upper marginal portion 5 fits into a corresponding groove in the flange 4, thereby insuring the proper angular position of the parts.

To the upper edge of the marginal portion 5 is integrally secured the top 7 having the central bearing projection 8 for the plate 9 which has an easy running fit between the flange 3 and the top 7. In the top 7 and the marginal portion 5 is formed a recess 10 into which projects a finger piece 11 extending from the side of the plate 9 and which may be employed for turning the plate 9 on its pivot.

In the flange 3 is formed a series of perforations 12 opening into the outer condiment compartment 13 and the top 7 is also provided with a series of perforations 14 which register with the perforations 12. The plate 9 is provided with a series of perforations 15 which serve to open and close the passage through the perforations 12 and 14 by moving the perforations 15 into and out of registry with the perforations 12 and 14. There is also in the top 7, a series of perforations 16 which are adapted to open into the receptacle 2 and the plate 9 has a series of perforations 17 adapted to be moved into and out of registry with the perforations 16 to open and close the dispensing openings for the receptacle 2.

The perforations are so arranged that those for dispensing from the outer compartment will be closed when those for the inner receptacle are open and vice versa. Thus, in Fig. 1, the perforations for dispensing from the outer receptacle are open while the perforations 17 in the plate 9 are out of registry with the perforations 16 in the top 7, so that the dispensing openings for the central compartment are closed. When, however, the finger piece 11 is moved into the position as shown in Fig. 3, and of course the plate 9 being correspondingly moved, the perforations 15 in the plate 9 will be out of registry with the perforations 14 and 12 so that the dispensing openings for the compartment 13 will be closed while the perforations 16 and 17 will be in registry, and therefore the dispensing openings for the inner compartment will permit the condiment to be dispensed from that compartment.

If the finger piece 11 be moved to mid position, the dispensing openings for both compartments will be closed.

A bottom portion 18 is provided which is detachably secured to the side wall 1 by being screw-threaded thereto, the inner edge of the portion 18 engaging with the receptacle 2, such receptacle extending through a central opening in the bottom portion 18.

The bottom of the receptacle 2 is closed by means of a detachable closure 19 which is screw-threaded to the receptacle and may be turned to attach or detach the closure by means of a fin 20 on the closure. It will thus be seen that the bottom portion 18 and the closure 19 are independently detachable so that either condiment compartment may be opened while leaving the other closed.

The bottom portion 18 is provided with a funnel-shaped recess 21 which aids in guiding the material into the inner receptacle to replenish the same and also provides space for the fin 20 whereby the last is lifted above the lower edge of the bottom portion so that it does not interfere with the shaker standing squarely on the lower edge of the bottom portion 18.

A large number of different materials may be employed in the construction of the shaker but a highly desirable material for this purpose has been found to be cellulose acetate which may be readily molded into the desired forms. When this material is used the inner receptacle may be secured in position by cementing the flange 4 and the upper marginal portion 5 together by the use of acetone or other suitable cement.

Referring to Fig. 5 there is shown a modified construction of the bottom portion of a shaker, the shaker being otherwise the same as that shown in the preceding figures. In the structure of this Fig. 5 the outer wall 1' has screw-threaded to it the bottom portion 18' having the funnel-shaped recess 21' and the central hole within which fits the head 22 of the closure 19' screwed into the bottom end of the inner receptacle 2', the lower end of the receptacle 2' abutting against the bottom portion 18' about the central hole in the latter. The head 22 is provided with a slot 23 for the reception of a screw driver to facilitate the screwing in and out of the closure with relation to the receptacle 2'.

While the invention has been illustrated in what are considered its best applications, it may have other embodiments without departing from its spirit and is not, therefore, limited to the structures shown in the drawing.

What I claim is:

1. A condiment shaker comprising in combination an outer casing including a side wall and top, said side wall enclosing an inner space for condiment, an inner receptacle spaced from the said side wall to form a chamber for condiment therebetween, a flange extending from and fixed to said inner receptacle and secured at its outer edge in fixed relation to said casing, there being perforations in said flange and perforations registering therewith in said top, said perforations being adapted to permit dispensing from the compartment about said receptacle, said top having other perforations adapted to permit dispensing from the interior of said receptacle and a plate rotatably mounted between said top and said flange, said plate having perforations for alternately permitting dispensing from the interior of said receptacle and from the condiment space thereabout, said flange having a depending marginal flange, the outer surface of which has a taper, and said side wall having a taper upon its inner side fitting the aforesaid flange taper.

2. A condiment shaker comprising in combination an outer casing including a side wall and top, said side wall enclosing an inner space for condiment, an inner receptacle spaced from the said side wall to form a chamber for condiment therebetween, a flange extending from and fixed to said inner receptacle and secured at its outer edge in fixed relation to said casing, there being perforations in said flange and perforations registering therewith in said top, said perforations being adapted to permit dispensing from the compartment about said receptacle, said top having other perforations adapted to permit dispensing from the interior of said receptacle and a plate rotatably mounted between said top and said flange, said plate having perforations for alternately permitting dispensing from the interior of said receptacle and from the condiment space thereabout, said flange having a depending marginal flange, the outer surface of which has a taper, and said side wall having a taper upon its inner side fitting the aforesaid flange taper and means for locating said flange and side wall in predetermined angular relationship about the axis of said outer casing.

3. A condiment shaker comprising in combination an outer casing including a side wall and top, said side wall enclosing an inner space for condiment, an inner receptacle spaced from the said side wall to form a chamber for condiment therebetween, a flange extending from said inner receptacle and secured at its outer edge to said casing, there being perforations in said flange and perforations registering therewith in said top, said perforations being adapted to permit dispensing from the compartment about said receptacle, said top having other perforations adapted to permit dispensing from the interior of said receptacle and a plate rotatably mounted between said top and said flange, said plate having perforations for alternately permitting dispensing from the interior of said receptacle and from the condiment space thereabout, said flange having a depending marginal flange, the outer surface of which has a taper, and said side wall having a taper upon its inner side fitting the aforesaid flange taper and a rib and groove connection between said flange and side wall.

4. A condiment shaker comprising in combination an outer casing including a side wall and top, said side wall enclosing an inner space for condiment, an inner receptacle spaced from the said side wall to form a chamber for condiment therebetween, a flange extending from said inner receptacle, said flange having a depending marginal flange fitting within the said side wall, said depending flange being secured to said side wall, there being perforations in the first mentioned flange and perforations registering therewith in said top, said perforations being adapted to permit dispensing from the compartment about said receptacle, said top having other perforations adapted to permit dispensing from the interior of said receptacle, a plate rotatably mounted between said top and the first mentioned flange, said plate having pedforations for alternately permitting dispensing from the interior of said receptacle and from the condiments spaced thereabout, a bottom portion having a central cone-shaped recess, said bottom portion being screw-threaded to said side wall and forming a bottom between said receptacle and said side wall, said bottom engaging said receptacle but being unsecured thereto.

PAUL BLACK.